United States Patent
Campbell et al.

(10) Patent No.: US 7,138,463 B2
(45) Date of Patent: Nov. 21, 2006

(54) CARBAMATE FUNCTIONAL ADDITION POLYMERS AND A METHOD FOR THEIR PREPARATION

(75) Inventors: Donald Campbell, Hartland, MI (US); Donald L St. Aubin, Commerce Township, MI (US); Walter H Ohrbom, Hartland Township, MI (US)

(73) Assignee: BASF Corporation, Southfield, MI (US)

( * ) Notice: Subject to any disclaimer, the term of this patent is extended or adjusted under 35 U.S.C. 154(b) by 222 days.

(21) Appl. No.: 11/004,090

(22) Filed: Dec. 3, 2004

(65) Prior Publication Data

US 2005/0154163 A1 Jul. 14, 2005

Related U.S. Application Data

(63) Continuation of application No. 10/285,214, filed on Oct. 31, 2002, now abandoned.

(51) Int. Cl.
*C08F 8/30* (2006.01)

(52) U.S. Cl. ............. 525/377; 525/327.3; 525/327.6

(58) Field of Classification Search ......... 525/377, 525/327.3, 327.6
See application file for complete search history.

(56) References Cited

U.S. PATENT DOCUMENTS

| | | | |
|---|---|---|---|
| 3,488,329 A * | 1/1970 | Johnson | 525/327.6 |
| 3,597,468 A * | 8/1971 | Kalopissis et al. | 525/326.2 |
| 4,704,442 A | 11/1987 | Just et al. | |
| 4,705,885 A | 11/1987 | Just et al. | |
| 5,336,566 A | 8/1994 | Rehfuss | |
| 5,356,669 A | 10/1994 | Rehfuss et al. | |
| 5,384,375 A * | 1/1995 | Roberts | 525/327.6 |
| 5,451,656 A | 9/1995 | Menovcik et al. | |
| 5,508,379 A | 4/1996 | Menovcik et al. | |
| 5,512,639 A | 4/1996 | Rehfuss et al. | |
| 5,532,061 A | 7/1996 | Menovcik et al. | |
| 5,559,195 A * | 9/1996 | McGee et al. | 525/383 |
| 5,593,785 A | 1/1997 | Mayo et al. | |
| 5,639,828 A | 6/1997 | Briggs et al. | |
| 5,693,723 A | 12/1997 | Green | |
| 5,693,724 A | 12/1997 | Green | |
| 5,719,237 A | 2/1998 | Rehfuss et al. | |
| 5,852,136 A | 12/1998 | Green | |
| 5,872,195 A | 2/1999 | Green et al. | |
| 5,994,479 A | 11/1999 | Green et al. | |
| 6,080,825 A | 6/2000 | Ohrbom et al. | |
| 6,084,038 A | 7/2000 | Ohrbom et al. | |
| 6,160,058 A | 12/2000 | Ohrbom et al. | |
| 6,262,297 B1 | 7/2001 | Clements et al. | |
| 6,346,591 B1 | 2/2002 | Ohrbom et al. | |

\* cited by examiner

*Primary Examiner*—Bernard Lipman

(57) ABSTRACT

A carbamate or terminal urea functional vinyl polymer is prepared by reacting a compound having an hydroxyl group and a carbamate group, terminal urea group, or a group that can be converted to a carbamate or terminal urea group, with a cyclic carboxylic acid anhydride group to form an ester bond and a free acid group from the anhydride; and reacting the free acid group with a compound having an epoxide group. The cyclic carboxylic acid anhydride group may be pendant to a vinyl polymer, or one of the compound having an hydroxyl group, a compound having the cyclic carboxylic acid anhydride group, and the compound having an epoxide group may have polymerizable ethylenic unsaturation that is polymerized, optionally with one or more copolymerizable monomers to form a vinyl polymer. When the compound having an hydroxyl group has a group that can be converted to a carbamate or terminal urea group, the group is converted to the carbamate or terminal urea group after step (a). The carbamate or terminal urea functional vinyl polymer may be included in a coating composition. The coating composition may be applied to a substrate and cured to form a cured coating on the substrate.

12 Claims, No Drawings

CARBAMATE FUNCTIONAL ADDITION POLYMERS AND A METHOD FOR THEIR PREPARATION

CROSS-REFERENCE TO RELATED APPLICATIONS

This application is a continuation of U.S. patent application Ser. No. 10/285,214 filed Oct. 31, 2002 now abandoned. The disclosure of the above application is incorporated herein by reference.

FIELD OF THE INVENTION

This invention concerns thermoset coating compositions, especially for the exteriors of automotive vehicles.

BACKGROUND OF THE INVENTION

Carbamate-functional materials have found particular utility in coating compositions as crosslinkable resins. Curable coating compositions utilizing carbamate-functional resins are described, for example, in U.S. Pat. Nos. 5,693,724, 5,693,723, 5,639,828, 5,512,639, 5,508,379, 5,451,656, 5,356,669, 5,336,566, and 5,532,061, each of which is incorporated herein by reference. These coating compositions can provide significant advantages over other coating compositions, such as hydroxy-functional acrylic/melamine coating compositions. For example, the coatings produced using carbamate-functional resins typically have excellent resistance to environmental etch (also called acid etch) and degradation. Environmental etch results in spots or marks on or in the coating that often cannot be rubbed out.

Automotive finishes are applied in a series of coating layers, with each coating layer providing an important function in the performance of the composite finish. For instance, primer coating layers are used to protect the substrate from corrosion, chipping, and delamination of the coating from the substrate. Surfacer and primer surfacer layers are commonly used to provide a smooth surface upon which to apply the topcoat layers, and may add increased corrosion protection or chip protection. The topcoat layers provide beauty as well as protection against scratching, marring, and environmentally-induced degradation. Topcoats for automotive and other industrial applications may be a one-layer coating, in which the color is generally uniform through the coating layer, or a clearcoat-basecoat composite coating, having a colored basecoat layer underlying a transparent clearcoat layer. Basecoat-clearcoat composite coatings are widely used and are notable for desirable gloss, depth of color, distinctness of image and/or special metallic effects. Composite coatings are particularly utilized by the automotive industry to achieve a mirror-like, glossy finish.

Green, U.S. Pat. Nos. 5,872,195, 5,852,136, 5,693,724, and 5,693,723, describe carbamate-functional components prepared by reacting an epoxide-functional compound with a carboxylic acid-functional compound to produce a reaction product having hydroxyl functionality, then reacting the hydroxyl functionality with cyanic acid, which may be formed by the thermal decomposition of urea, or a carbamate compound having functionality reactive with the hydroxyl functionality, e.g. by esterification.

One method of producing carbamate-functional materials is by transcarbamylation or transesterification reaction of the hydroxyl-functional material with an alkyl carbamate (e.g., methyl carbamate, ethyl carbamate, or butyl carbamate). The reaction is carried out using a catalyst, such as an organometallic catalyst (e.g., dibutyl tin dilaurate). This method has certain drawbacks, one of which is that the presence of acid poisons the tin catalyst. If the carbamate material is produced by transcarbamylation and acid functionality is desired, then it is necessary to introduce the acid functionality after the transcarbamylation is complete. Another drawback is that the transcarbamylation process can require certain additional, expensive equipment to handle the low molecular weight carbamate compounds that are typically used in the process.

It would be desirable to produce carbamate functional materials such as carbamate functional polymers by a method that avoids the difficulties of the transcarbamylation process.

SUMMARY OF THE INVENTION

The invention provides a method of making a carbamate or terminal urea functional vinyl polymer and a coating composition containing the carbamate or terminal urea functional vinyl polymer. The vinyl polymer is prepared by reacting an hydroxy carbamate or hydroxy terminal urea compound, or a compound having an hydroxyl group and a group that can be converted to a carbamate or terminal urea group, with a cyclic carboxylic acid anhydride group to form an ester bond and a free acid group from the anhydride, then reacting the free acid group with an epoxide group. When the hydroxy compound has a group that can be converted to a carbamate or terminal urea group, the group is converted to the carbamate or terminal urea group at some point after reaction of the hydroxyl compound with the anhydride.

The vinyl polymer product is obtained by either using a polymerizable reactant, which is polymerized in a further step, or by using a polymeric reactant. Thus, in the first instance, one of the reactants has polymerizable ethylenic unsaturation, with the ethylenic unsaturation being polymerized following reaction of that reactant. In the alternative instance, one of the reactants is a vinyl polymer, having one or more, preferably a plurality, of the reactive functional group. A vinyl polymer having one or more pendant carboxylic acid anhydride groups or a vinyl polymer having one or more pendant epoxide groups may be used as a reactant.

A carbamate group according to the invention may be represented by the structure

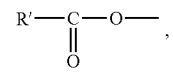, in which R' is H or alkyl. Preferably, R' is H or alkyl of from 1 to about 4 carbon atoms, and more preferably R' is H (a primary carbamate). The term "secondary carbamate group" is used to refer to a group in which R' is an alkyl group. A terminal urea group may be represented by the structure

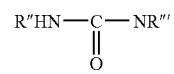

in which R" and R'" are each independently H or alkyl or R" and R'" together form a heterocyclic ring structure. Preferably, R'" and R'" are each independently or together form an ethylene bridge, and more preferably R" and R'" are each H (a primary terminal urea).

The invention further provides a vinyl polymer having a monomer unit

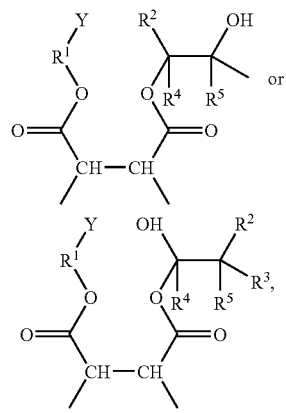

wherein Y is a carbamate or urea group, $R^1$ and $R^3$ are each independently alkyl groups having from 1 to 12 carbon atoms, optionally including oxygen or other heteroatoms, and $R^2$, $R^4$ and $R^5$ are each independently H or alkyl of 1 to 4 carbon atoms. $R^1$ and $R^3$ may each independently be linear, branched, or contain cyclic groups.

In another embodiment, the invention provides a vinyl polymer having a monomer unit

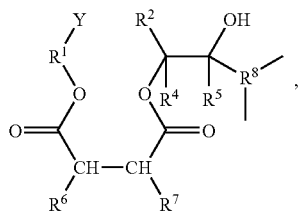

wherein Y, $R^1$, $R^2$, $R^4$, and $R^5$ are as previously defined; $R^6$ and $R^7$ are each independently H, an alkyl group having from 1 to 12 carbon atoms, or $R^6$ and $R^7$ together are part of a cycloaliphatic structure, optionally including oxygen or other heteroatoms; and $R^8$ is an alkynyl group having an ethylene group in the polymer backbone, preferably containing 1 to 10 carbon atoms and preferably containing an ester group.

The coating composition of the invention includes the vinyl polymer having carbamate or terminal urea functionality. The carbamate or terminal urea functionality may be provided by reacting a cyclic carboxylic acid anhydride with a compound having an hydroxyl group and carbamate or terminal urea functionality, or functionality that can be converted to carbamate or terminal urea functionality, to form an ester and a free acid group. In one embodiment, one of the cyclic carboxylic acid anhydride or the epoxide functionality is pendant to a vinyl polymer or one of the reactants has ethylenic unsaturation that is polymerized, preferably with desired comonomers, after reaction of that reactant. If the cyclic carboxylic anhydride or the compound having an hydroxyl group has the unsaturation, the polymerization may take place after the reaction of those two compounds or after the reaction of the product with the monoepoxide. If the monoepoxide compound has the unsaturation, the polymerization is carried out after reaction of the monoepoxide with the liberated acid group. The ester product having ethylenic unsaturation is then polymerized to provide the vinyl polymer having carbamate or terminal urea functionality, or to provide a polymer having functionality that is converted after the polymerization to carbamate or terminal urea functionality. Alternatively, the polymer having carbamate or terminal urea functionality may be provided by copolymerizing a cyclic carboxylic acid anhydride having one ethylenically unsaturated bond (a cyclic unsaturated anhydride) and, during or following polymerization, reacting the anhydride with a compound having an hydroxyl group and carbamate or terminal urea functionality or functionality that can be converted to carbamate or terminal urea functionality, then reacting the acid groups (or a desired portion of the acid groups to provide a desired acid number of the polymer) with a monoepoxide compound. In yet another embodiment, the polymer having carbamate or terminal urea functionality may be provided by copolymerizing an unsaturated monoepoxide compound, and, and, during or following polymerization, reacting the epoxide group(s) with the acid-functional product of the reaction of the cyclic carboxylic acid anhydride compound and the compound having an hydroxyl group and carbamate or terminal urea functionality or functionality that can be converted to carbamate or terminal urea functionality.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The vinyl polymer having pendant carbamate or terminal urea functionality may be formed using a copolymer of an ethylenically unsaturated, cyclic acid anhydride compound, or by using a copolymer of the product of an ethylenically unsaturated, cyclic acid anhydride compound with the hydroxy compound, copolymerizing the reaction product of an ethylenically unsaturated, cyclic acid anhydride compound half ester of the hydroxy compound reacted with the monoepoxide compound. Suitable examples of ethylenically unsaturated, cyclic acid anhydride materials include, without limitation, anhydrides of ethylenically unsaturated dicarboxylic acids containing 4 to 6 carbon atoms, including fumaric, maleic, and itaconic dicarboxylic acid anhydrides; and such compounds having alkyl substituents, particularly those having one to four carbons atoms, optionally with heteroatoms. Other suitable examples include the Diels Alder products from maleic anhydride and conjugated dienes. These include tetrahydrophthalic anhydride, dodecenyl succinic anhydride, and methyl-5-norborene-2,3-dicarboxylic anhydride, which are available from Lonza Inc.

The cyclic acid anhydride functionality is reacted, either before or after polymerization, with an hydroxyl compound having carbamate or terminal urea functionality or functionality that can be converted to carbamate or terminal urea functionality. The hydroxyl compound preferably has a carbamate or terminal urea group. When the hydroxyl compound has a group that can be converted to the carbamate or terminal urea group, that conversion may be carried out either at the same time as the reaction with the cyclic acid anhydride or with the epoxide compound or (the acid anhydride is not polymerized) during polymerization, or at any time after one of these reactions.

Groups that can be converted to carbamate groups include cyclic carbonate groups, epoxide groups, and unsaturated bonds. Cyclic carbonate groups can be converted to carbamate groups by reaction with ammonia or a primary amine, which ring-opens the cyclic carbonate to form a beta-hydroxy carbamate. Epoxide groups can be converted to carbamate groups by first converting to a cyclic carbonate group by reaction with $CO_2$. This can be done at any pressure from atmospheric up to supercritical $CO_2$ pressures, but is preferably under elevated pressure (such as 60–150 psi). The temperature for this reaction is preferably kept low enough to substantially prevent reaction of the epoxide group with the free acid liberated from the anhydride. Useful catalysts include any that activate an oxirane ring, such as tertiary amines or quaternary salts like tetramethyl ammonium bromide, combinations of complex organotin halides such as trimethyl tin iodide, tetrabutyl potassium iodide, potassium salts such as potassium iodide and potassium carbonate preferably in combination with crown ethers, tin octoate, calcium octoate, and so on. The cyclic carbonate group can then be converted to a carbamate group as already described. Six-membered cyclic carbonates can be synthesized by reacting phosgene with 1,3-propanediol under appropriate conditions for forming the cyclic carbonate. A cyclic carbonate can also be formed by reacting a 1,2-diol with diethyl carbonate. An unsaturated bond can be converted to a carbamate group by first reacting with peroxide to convert it to an epoxide group, then with $CO_2$ to form a cyclic carbonate, and then with ammonia or a primary amine to form the carbamate group. Epoxide groups are not preferred because of the potential reaction with the acid group from the anhydride. When the half-ester product of the cyclic anhydride and hydroxy compound or the product of the half-ester and the epoxide compound will be polymerized, it is preferred not to use polymerizable unsaturated bonds as the group convertible to a carbamate group unless the conversion to a carbamate group is carried out before the polymerization step.

Groups such as oxazolidone can be converted to terminal urea groups. For example, hydroxyethyl oxazolidone can be reacted with the carboxylic acid anhydride group and then the oxazolidone group on the product can be reacted with ammonia or a primary amine to generate a terminal urea functional group.

Suitable examples of the hydroxyl compounds having a carbamate group, a terminal urea group, or a group that can be converted to a carbamate group or a terminal urea group include, without limitation, hydroxyalkyl carbamates including hydroxyethyl carbamate, hydroxypropyl carbamate, and hydroxybutyl carbamate; glycidol (the epoxide group can be converted to carbonate with $CO_2$, then reacted with ammonia or a primary amine to provide a carbamate group), glycerine carbonate, 3-hydroxypropyl carbonate (the carbonate group of which can be reacted with ammonia or a primary amine to provide a carbamate group), unsaturated alcohols such as hydroxyethyl oxazolidone, allyl alcohol, hydroxyethyl acrylate, and hydroxyethyl methacrylate (the double bond of which can be oxidized to an epoxide group, then converted to a carbamate group as already outlined). In one embodiment, the hydroxyl-and carbamate-functional or terminal urea-functional compound or hydroxyl-functional compound having a group that can be converted to carbamate or terminal urea is an hydroxyalkyl carbamate. Examples of hydroxyalkyl carbamates include, without limitation, hydroxyethyl carbamate, hydroxypropyl carbamate, hydroxybutyl carbamate, and the hydroxy carbamates produced by reacting the epoxy ester of neodecanoic acid with carbon dioxide under pressure to produce the carbonate and then reacting the carbonate with ammonia or a primary amine. Other hydroxy carbamates may be produced by reacting ammonia or a primary amine with 4,4,6-trimethyl-1,3-dioxan-2-one (available as XTC-27 from Huntsman) to yield, in the case of ammonia, 3-carbamoyl-3,3,1-trimethyl propanol. Hydroxy carbamates may also be prepared by transcarbamation of a compound containing one primary hydroxyl group and a secondary hydroxyl group, such as 2,4-ethyl-1,5 octanediol. The transcarbamation is specific enough to yield over 90% of the product in which the carbamate has been introduced only at the primary hydroxyl site. In one embodiment, the hydroxy carbamate compound is a compound in which the hydroxyl group is separated from the carbamate group by at least three carbons. Formation of such compounds is described, e.g., in Clements, U.S. Pat. No. 6,262,297.

In one embodiment of the present invention, the hydroxyalkylcarbamate contains up to 15% by weight of an alkylcarbonate precursor before and during the reaction with the anhydride.

In another embodiment, the hydroxy and carbamate functional compound is a β-hydroxy carbamate compound. The β-hydroxy carbamate groups have the isomeric structures

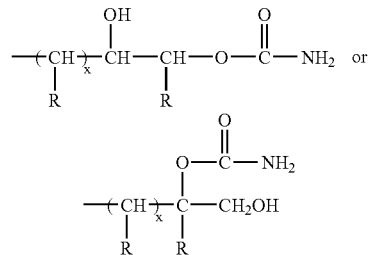

A β-hydroxy carbamate compound may be prepared by reacting a glycidyl-group containing compound first with carbon dioxide to convert the oxirane group to a cyclic carbonate group, and then with ammonia or a primary amine to convert the cyclic carbonate group to a β-hydroxy carbamate group. Examples of suitable oxirane group-containing compounds include, without limitation, glycidyl esters, glycidyl ethers, and epoxides of monoalkenes. The oxirane group is first converted to a cyclic carbonate group by reaction with $CO_2$. This can be done at any pressure from atmospheric up to supercritical $CO_2$ pressures, but is preferably under elevated pressure (e.g., 60–150 psi). The temperature for this reaction is preferably 60–150° C. Useful catalysts include any that activate an oxirane ring, such as tertiary amine or quaternary salts (e.g., tetramethyl ammonium bromide), combinations of complex organotin halides and alkyl phosphonium halides (e.g., $(CH_3)_3SnI$, $Bu_4SnI$, $Bu_4PI$, and $(CH_3)_4PI$), potassium salts (e.g., $K_2CO_3$, $KI$)

preferably in combination with crown ethers, tin octoate, calcium octoate, and the like. The cyclic carbonate group is then reacted with ammonia or a primary amine. The primary amine preferably has up to four carbons, e.g. methyl amine. Preferably, the cyclic carbonate is reacted with ammonia. The ammonia may be aqueous ammonia (i.e., $NH_4OH$).

A β-hydroxy carbamate compound may also be prepared by reacting a cyclic carbonate-containing compound with ammonia or a primary amine to convert the cyclic carbonate group to a β-hydroxy carbamate group.

The hydroxyl compound is reacted with the acid anhydride. Preferably, the reaction temperature is from about 50° C. to about 120° C. A base catalyst may be included, such as dimethyl dodecyl amine or dimethyl amino pyridine.

In one embodiment, an excess of the hydroxy compound is reacted with the acid anhydride groups. The excess, unreacted hydroxy compound may then be reacted with a polyisocyanate compound as described in Rehfuss, Ohrbom, St. Aubin and Taylor, U.S. Pat. No. 5,719,237.

Reaction of the hydroxyl compound with the acid anhydride provides a carboxylic acid group that is in turn reacted with a monoepoxide compound. The monoepoxide compound may be selected from, for example and without limitation, glycidyl esters, glycidyl ethers, and epoxides of alkenes. In one preferred embodiment, the epoxide is a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. Glycidyl esters such as Cardura® E are commercially available. The acid portion of the glycidyl ester may have up to about 40 carbon atoms, preferably up to about 20 carbon atoms, and more preferably up to about 12 carbon atoms.

Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like.

Epoxides may also be prepared by reacting a compound containing a double bond with peroxide or peracetic acid. Useful double bond-containing compounds include, without limitation, cycloaliphatic monounsaturated compounds such as cyclohexene and substituted cyclohexenes, ethylene, propylene, styrene, styrene oxide, and the like.

The carboxylic acid and the monoepoxide compound are reacted together under appropriate conditions, The reaction temperature might typically be from about 50° C. to about 150° C., and a base catalyst may be included, such as dimethyl dodecyl amine or dimethyl amino pyridine.

Not all of the carboxylic acid groups need be reacted with the monoepoxide compound. It is often desirable to prepare a polymer having a given acid number due to residual carboxylic acid groups.

The unsaturated carboxylic acid anhydride material may be copolymerized, either before reaction with the hydroxyl compound or after reaction with the hydroxyl compound or both the hydroxyl compound and the epoxide functional compound, with any of a number of possible comonomers. Suitable comonomers include, for example and without any limitation, alkylene hydrocarbons such as ethylene, propylene butylene, and octene; aromatic hydrocarbon vinyl compounds such as styrene and alpha-methyl styrene; vinyl ester monomers such as vinyl acetate; (meth)acrylic monomers such as methyl (meth)acrylate, ethyl (meth)acrylate, propyl (meth)acrylate, n-butyl (meth)acrylate, t-butyl (meth)acrylate, isobutyl (meth)acrylate; 2-ethylhexyl (meth)acrylate, cyclohexyl (meth)acrylate, and so on; and combinations of these.

The polymerization may be carried out by any of the usual methods, including bulk polymerization, solution polymerization, and emulsion polymerization.

In alternative embodiments of the invention, the cyclic acid anhydride compound does not have ethylenic unsaturation. In this case, either one of the hydroxy carbamate compound or the epoxide compound is unsaturated and is polymerized after being reacted, or the epoxide groups are pendant to a vinyl polymer. Examples of ethylenically unsaturated hydroxy carbamate compounds and epoxide compounds include, without limitation, the ethylenically unsaturated compounds disclosed by Ohrbom and Herrel in U.S. Pat. No. 6,346,591, glycidyl ethers and esters of unsaturated alcohols and acids, such as allyl glycidyl ether, glycidyl acrylate, and glycidyl methacrylate, and the β-hydroxy carbamate compounds prepared by reacting such unsaturated glycidyl compounds first with carbon dioxide to convert the oxirane group to a cyclic carbonate group, and then with ammonia or a primary amine to convert the cyclic carbonate group to a β-hydroxy carbamate group.

In these embodiments, a cyclic anhydride is used that does not have polymerizable unsaturation. Suitable examples of such cyclic anhydrides include, without limitation, succinic anhydride, phthalic anhydride, hexahydrophthalic anhydride, and so on. The cyclic anhydride is reacted with the hydroxy compound, as before. When the hydroxy compound is polymerizable, the vinyl polymerization may be carried out at this point or after further reaction with the epoxide compound. When the epoxide compound is polymerizable, polymerization is carried out after reaction of the epoxide compound with the half-ester product of the cyclic anhydride-hydroxy carbamate compound reaction. When a vinyl polymer having pendant epoxide groups is used, the half-ester product of the cyclic anhydride-hydroxy carbamate compound reaction is reacted with the pendant epoxide groups.

The coating composition may include further carbamate-functional compounds. Such carbamate-functional compounds include, without limitation, any of those described in U.S. Pat. Nos. 6,160,058, 6,084,038, 6,080,825, 5,994,479, the disclosures of which are incorporated by reference.

The coating composition further includes one or more crosslinkers reactive with active hydrogen groups. Particularly useful crosslinkers include, without limitation, materials having active methylol or methylalkoxy groups, such as aminoplast crosslinking agents or phenol/formaldehyde adducts. Examples of preferred curing agent compounds include melamine formaldehyde crosslinkers, including monomeric or polymeric melamine resin and partially or fully alkylated melamine resin, urea resins, and methylol ureas such as urea formaldehyde resin, alkoxy ureas such as butylated urea formaldehyde resin. Other useful crosslinkers include, without limitation, polyisocyanates and blocked polyisocyanates. The curing agent may be combinations of these. Aminoplast resins such as melamine formaldehyde resins or urea formaldehyde resins are especially preferred.

In preferred embodiments, the crosslinker is at least about 5%, more preferably at least about 10% by weight of the nonvolatile vehicle. "Nonvolatile vehicle" refers to the film-forming components. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The coating composition may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

A solvent or solvents may be utilized in the coating composition. In general, the solvent can be any organic solvent and/or water. In one preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl etheracetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

When the coating composition is a primer composition or pigmented topcoat composition, such as a basecoat composition, one or more pigments and/or fillers may be included. Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Additional agents, for example hindered amine light stabilizers, ultraviolet light absorbers, anti-oxidants, surfactants, stabilizers, wetting agents, rheology control agents, dispersing agents, adhesion promoters, etc. may be incorporated into the coating composition. Such additives are well-known and may be included in amounts typically used for coating compositions.

Coating compositions can be coated on the article by any of a number of techniques well-known in the art. These include, for example, spray coating, dip coating, roll coating, curtain coating, and the like. For automotive body panels, spray coating is preferred.

The coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

Application can be, for example, by electrostatic spraying or by use of a fluidized bed. Electrostatic spraying is the preferred method. The coating composition can be applied in one or more passes to provide a film thickness after cure of typically from about 20 to about 100 microns.

After application of the coating composition to the substrate, the coating is cured, preferably by heating at a temperature and for a length of time sufficient to cause the reactants to form an insoluble polymeric network. The cure temperature is usually from about 105° C. to about 175° C., and the length of cure is usually about 15 minutes to about 60 minutes. Preferably, the coating is cured at about 120° C. to about 150° C. for about 20 to about 30 minutes. Heating can be done in infrared and/or convection ovens.

The coating composition is preferably utilized as the clearcoat of an automotive composite color-plus-clear coating. The pigmented basecoat composition over which it is applied may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The clearcoat coating composition is generally applied wet-on-wet over a basecoat coating composition as is widely done in the industry. The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the crosslinking agents, however they generally range between 90° C. and 180° C. In a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers; however, typical curing times range from 15 to 60 minutes, and preferably 15–25 minutes for blocked acid catalyzed systems and 10–20 minutes for unblocked acid catalyzed systems. The curing times may also be expressed as time after metal temperature reaches the bake temperature ("metal temperature"). For example, the curing time may be for 5 to 30 minutes, preferably 10 to 20 minutes, at metal temperature,

EXAMPLES

The invention is further described in the following example. The examples are merely illustrative and do not in any way limit the scope of the invention as described and claimed. All parts are parts by weight unless otherwise noted.

Example 1

Preparation of Carbamate-Functional Vinyl Polymer of the Invention

A suitable flask was charged with 246.8 grams 1-octene under a nitrogen blanket. The 1-octene was heated to 115° C. Then, 56.4 grams 2,2'-azobis(2 methylbutyronitrile) (Vazo 67 supplied by DuPont) and 305.3 grams butyl acetate was added to flask over three hours. Thirty minutes into this addition, a two-hour addition of a mixture of 196.2 grams maleic anhydride and 600 grams butyl acetate was begun. After both additions were completed, the contents of the flask were held at 115° C. for one hour. After this hold, 210 grams hydroxyethyl carbamate (CarboLink HEC supplied by Huntsman) was added and the reaction mixture was reheat to 115° C. This temperature was maintained until the anhydride IR peak at 1750 cm-1 disappeared. Then, 490 grams Cardura E (supplied by Shell) was added and the flask contents were heat to 135° C. The temperature was maintained at 135° C. until the epoxide was no longer detectable by titration. The product was cooled to 110° C. and 284 grams monomethyl ether of propylene glycol were added.

Example 2

Preparation of Clearcoat of the Invention

The following materials were combined: 91.0 grams of BM9539; 11.0 grams of a blocked acid catalyst solution; 22.7 grams of a UV light stabilizer package; 16 grams of Exxate 1000 (obtained from ExxonMobil); 230.1 grams of Exxate 600 (obtained from ExxonMobil); 1.6 grams of Silwet L7604 (obtained from Crompton); 1.0 grams LAP-20 (obtained from Kusumoto); and 429.5 grams of the Carbamate-Functional Vinyl Polymer of Example 1.

Comparative Example A

Preparation of Comparative Clearcoat

The following materials were combined: 116.6 grams of BM9539 11.0 grams of a blocked acid catalyst solution; 22.7 grams of a UV light stabilizer package; 16 grams of Exxate 1000 (obtained from ExxonMobil); 205.1 grams of Exxate 600 (obtained from ExxonMobil); 1.6 grams of Silwet L7604 (obtained from Crompton); 1.0 grams LAP-20 (obtained from Kusumoto); and 429.0 grams of the a resin prepared according to Example IVA of Campbell et al., U.S. patent application Ser. No. 09/677,063, filed Sep. 29, 2000.

Evaluation of Clearcoat Compositions

For each of the clearcoat compositions of Examples 2 and Comparative Example A, a layer of a commercial basecoat composition (E54 KW119, available from BASF Corporation, Southfield, Mich.) was applied according to the manufacturer's directions over electrocoat primed 4" by 12" steel panels. The applied basecoat layer was flashed for five minutes at 140° F. The clearcoat composition was then applied, flashed, and baked for 25 minutes at 275° F. to obtain a cured clearcoat layer with a thickness of about 2 mils. The panels were tested by outdoor exposure at 0° (horizontal) on Blount Island in Jacksonville, Fla. for 14 weeks in the summer. The exposed panels were then rated for environmental etching damage using a 1–10 scale, with 10 being complete failure and 0 being no damage. A rating of 6 or less is considered to be acceptable etch resistance after 14 weeks exposure. The clearcoat of Example 2 was rated 5; and the clearcoat of Comparative Example A was rated 4.

This indicates that the present invention produces the same high degree of acid etch resistance as those produced by transcarbamation.

Example 3

Preparation of Carbamate-Functional Vinyl Polymer of the Invention

A suitable reactor was charged with 440.5 grams maleic anhydride, 471.5 grams hydroxyethyl carbamate (CarboLink HEC supplied by Huntsman), 330.4 grams monomethyl ether of propylene glycol acetate (Arcosolv PM), and 4.9 grams N,N-dimethyl dodecylamine under a nitrogen blanket. The mixture was heated to 90° C. and held at that temperature 4.5 hours. Then, 709.3 grams Cardura E (supplied by Shell) was charged to the reactor. The reaction mixture was held at 90° C. until the epoxide was no longer detectable by titration. The product had a Gardener Color Value of 1.

Example 4

Preparation of Carbamate-Functional Vinyl Polymer of the Invention

A suitable reactor was charged with 440.5 grams maleic anhydride, 554.7 grams hydroxyethyl carbamate/ethylene carbonate (85/15 ratio by weight solution supplied by Huntsman), 330.4 grams ethylene carbonate, and 4.9 grams N,N-dimethyl dodecylamine under a nitrogen blanket. The mixture was heated to 90° C. and held at that temperature 4.5 hours. Then, 709.3 grams Cardura E (supplied by Shell) was added to the flask and the mixture was held at 90° C. until the epoxide was no longer detectable by titration. The product had a Gardener Color Value of 0.

This monomer was subsequently polymerized with octene to form a copolymer. The copolymer is combined with a melamine-formaldehyde resin, a blocked acid catalyst, suitable solvent, and minor amounts of suitable additives to form a clearcoat coating composition. The clearcoat coating composition is applied to a substrate having thereon an uncured basecoat layer, and the clearcoat and basecoat layers are cured together.

The invention has been described in detail with reference to preferred embodiments thereof. It should be understood, however, that variations and modifications can be made within the spirit and scope of the invention.

What is claimed is:

1. A process for preparing a carbamate or terminal urea functional vinyl polymer, comprising steps of:
    (a) reacting a compound having an hydroxyl group and a carbamate group, terminal urea group, or a group that can be converted to a carbamate or terminal urea group, with a cyclic carboxylic acid anhydride group to form a half-ester product with a free acid group; and
    (b) reacting the free acid group with an epoxide group, wherein one of the cyclic carboxylic acid anhydride group or the epoxide group is pendant to a vinyl polymer
    and further wherein, when the compound having an hydroxyl group has a group that can be converted to a carbamate or terminal urea group, the group is converted to the carbamate or terminal urea group after step (a).

2. A process according to claim 1, wherein the cyclic carboxylic acid anhydride group is pendant to a vinyl polymer.

3. A process according to claim 2, wherein the vinyl polymer is a copolymer of maleic anhydride.

4. A process according to claim 1, wherein the epoxide group is pendant to a vinyl polymer.

5. A process according to claim 1, wherein the compound having the hydroxyl group has a carbamate or carbonate group.

6. A process according to claim 1, wherein the cyclic carboxylic acid anhydride group is provided by maleic anhydride.

7. A process according to claim 1, wherein the cyclic carboxylic acid anhydride group is provided by a member selected from the group consisting of fumaric anhydride, itaconic anhydride, alkyl-substituted maleic anhydride, and the Diels Alder products of maleic anhydride and conjugated dienes.

8. A process according to claim 1, wherein the compound having the hydroxyl group is an hydroxy carbamate or hydroxy carbonate compound.

9. A process according to claim 1, wherein the vinyl polymer has residual acid groups.

10. A process for preparing a carbamate or terminal urea functional vinyl polymer, comprising steps of:
    (a) reacting a compound having an hydroxyl group and a carbamate group, terminal urea group, or a group that can be converted to a carbamate or terminal urea group, with a copolymer of maleic anhydride to form a half-ester product with a free acid group; and
    (b) reacting the free acid group with a monoepoxide compound.

11. A process according to claim 10, wherein the compound having an hydroxyl group is glycerine carbonate or an hydroxyalkyl carbamate selected from the group consisting of hydroxyethyl carbamate, hydroxypropyl carbamate, and hydroxybutyl carbamate.

12. A process according to claim 11, wherein the hydroxyalkyl carbamate comprises up to 15% by weight of an alkylcarbonate precursor.

* * * * *